Patented June 13, 1950

2,511,784

UNITED STATES PATENT OFFICE 2,511,784

COMPOSITIONS CONTAINING 2,4-DICHLOROPHENOXYACETIC ACID AND PROCESS FOR THE PREPARATION THEREOF

Grady M. O'Neal, Chicago, Ill.

No Drawing. Application August 11, 1945,
Serial No. 610,397

2 Claims. (Cl. 260—521)

The present invention relates to plant growth substances, more particularly compositions containing as an active essential ingredient 2,4-dichlorophenoxyacetic acid, and to a process for the preparation thereof.

The compound, 2,4-dichlorophenoxyacetic acid, also known as "2,4-D" is of value as a plant growth regulatory factor. It has the chemical formula:

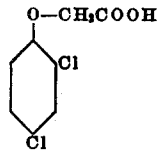

These plant growth substances, also known as auxins, plant hormones, plant growth stimulants, and referred to herein as "plant regulants," in very minute quantities, control or regulate the growth of the plant cell, and are also widely used as herbicides to kill weeds or other obnoxious vegetation.

This material has been prepared previously by chlorinating phenol, separating the 2,4-dichlorophenol from the chlorination mixture, effecting a caustic alkali condensation of 2,4-dichlorophenol with a mono-haloacetic acid, followed by an acidification of the alkali salt of the 2,4-dichlorophenoxyacetic acid with a suitable acidification agent in order to liberate the free acid. A typical and customary procedure for the condensation is that given by R. Pokorny, "J. Am. Chem. Soc.," vol. 63, p. 1768 (1941).

The condensation of 2,4-dichlorophenol with a monohaloacetic acid and the steps leading up to the isolation of the desired 2,4-dichlorophenoxyacetic acid proceeds smoothly and leaves little to be desired in terms of ease and feasibility of manufacture. The procurement of the needed 2,4-dichlorophenol to effect this condensation, however, is neither simple nor without considerable economic drawbacks. When phenol is dichlorinated, an isomeric mixture, consisting predominantly of 2,4-dichlorophenol and 2,6-dichlorophenol, results. The separation of this mixture into its component parts is difficult because of the similarity of physical properties, i. e., boiling point, solubility, specific gravity, and the like. Heretofore, this separation of the 2,6-dichlorophenol from the desired 2,4-dichlorophenol has been effected by employing a combination fractional distillation and fractional crystallization in which cooling and centrifuging operations are utilized. The carrying out of these operations are long, tedious, complex and, in view of the quantity of 2,6-dichlorophenol initially present (usually about 12-14% when optimum chlorination conditions are employed) involves a considerable capital expenditure and much waste motion in order to produce a relatively pure, but still not entirely pure, 2,4-dichlorophenol.

One of the objects of this invention is to provide a method of producing new and improved results in the over-all process of making 2,4-dichlorophenoxyacetic acid.

Another object is to provide a new and improved method for avoiding the objectionable features connected with the present manufacture of 2,4-dichlorophenoxyacetic acid and yet resulting in a product equal to, if not superior to, the present article of commerce.

A further object is to provide a simple, practical, economic, and novel process for manufacturing 2,4-dichlorophenoxyacetic acid.

A particular object of the invention is to eliminate the processing equipment and operational steps necessary to provide the 2,4-dichlorophenol of the prior art.

It is also an object of the invention to provide a 2,4-dichlorophenoxyacetic acid suitable for use as a plant growth regulant and as a herbicide, which may or may not consist entirely of 2,4-dichlorophenoxyacetic acid.

A further object of the invention is to eliminate the necessity for separating undesirable phenolic impurities consisting mainly of 2,6-dichlorophenol from desired 2,4-dichlorophenol after the chlorination step by subjecting a subsequently formed mixture of chlorophenoxyacetic acids to water washing.

Other objects and advantages will appear from the following detailed description and explanation of the invention.

These objects are accomplished in accordance with the invention by chlorinating phenol, condensing the resultant chlorination mixture directly with a mono-haloacetic acid, preferably monochloroacetic acid, in the presence of an alkaline substance, acidifying and treating with water to dissolve the more water-soluble chlorophenoxyacetic acid compounds, and separating the relatively water-insoluble 2,4-dichlorophenoxyacetic acid in any suitable manner. For some purposes, the chlorination mixture comprising mono-, di-, and tri-chlorophenoxyacetic acids may be employed as such, as hereinafter explained.

In practising the present invention, it has been found that the method of chlorination may vary, though the use of gaseous chlorine is preferred. Likewise, it is preferred that the chlorination temperature be low, preferably above the melting point of phenol and around 45–55° C., for high temperatures of chlorination tend to favor the formation of undesirable products at the expense of the desired 2,4-dichlorophenol. A chlorination catalyst may or may not be used.

In the dichlorination of phenol to give the optimum yield of 2,4-dichlorophenol, the following chlorinated phenols are present in the final chlorination mass:

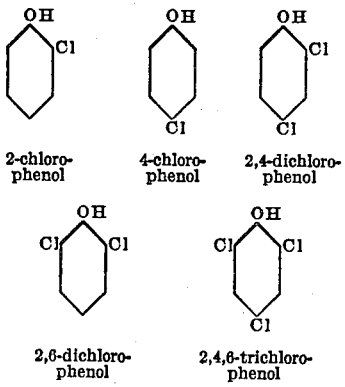

2-chlorophenol  4-chlorophenol  2,4-dichlorophenol 2,6-dichlorophenol  2,4,6-trichlorophenol Such a chlorination mass will have this approximate composition by weight: 2,4-dichlorophenol, 84–85%; 2,6-dichlorophenol, 12–14%; and 2-chloro-, 4-chloro-, and 2,4,6-trichlorophenols in the amount of 1–4%. The condensation mixture obtained by directly condensing the chlorinated mass with a monohaloacetic acid in the presence of an alkaline condensing agent will contain the same relative proportions of the respective chlorophenoxyacetic acids, viz., 84–85% of 2,4-dichlorophenoxyacetic acid; 12–14% of 2,6-dichlorophenoxy acetic acid; and 1–4% of 2-chloro-, 4-chloro-, and 2,4,6-trichlorophenoxyacetic acids. It has been determined in accordance with the invention that the ortho-substituted phenoxyacetic acids possess far greater water solubility than the para-substituted phenoxy acetic acids. Thus, the water washing dissolves the ortho derivatives and makes it possible to eliminate substantially all of these derivatives in a very simple manner. In this way, substantially all of the 2,6-dichloro-, the 2-chloro-, and the 2,4,6-trichlorophenoxyacetic acids are eliminated and the product obtained consists almost entirely of the 2,4-dichloro-, and the 4-chlorophenoxy acetic acids. The chlorophenols, on the other hand, do not possess these marked differences in solubility and a water washing of the chloro-phenol mixture would not produce the desired separation of the components of the chlorination mass.

In studies involving the use of mono- and di-chlorinated phenoxyacetic acids as plant growth regulatory factors, it has been determined that the 4-chlorophenoxyacetic and 2,4-dichlorophenoxyacetic acids possess great activity, with the 2,4-compound being the more efficacious of the two. The present invention provides an "impure" 2,4-dichlorophenoxyacetic acid, suitable for employment in plant growth regulatory use containing diluent mono-, di- and tri-chlorinated phenoxyacetic acids, or a substantially "pure" 2,4-dichlorophenoxyacetic acid. For many applications, the "impure" 2,4-dichlorophenoxyacetic acid may be utilized either as a plant growth regulatory factor or as a herbicide with satisfactory results; for others, the "pure" form may be more desirable. In the latter case, the "impure" 2,4-dichlorophenoxyacetic acid is treated by a water washing to give the desired "pure form," the water-soluble mono-, di- and tri-chlorinated phenoxyacetic acids being removed in the water wash liquor.

The condensation of the isomeric mixture of the dichlorophenols with the mono-haloacetic acid may be performed by any of the known methods for the formation of phenoxyacetic acids. Sodium hydroxide is preferred as the alkaline condensing agent. While mono-bromoacetic acid may be used as the mono-haloacetic acid in the condensation, mono-chloroacetic acid is preferred. Likewise, it may be stated that the condensation affording the phenoxyacetic acid is best effected in as highly concentrated reaction media as is feasible with processing practicality.

The method of removing the undesirable chlorophenoxyacetic acid impurities may be performed in a number of ways, but it is preferred that their removal be effected through the use of water washing after the free acid has been liberated from its alkali salt by means of a suitable acidifying agent, viz., acids such as sulfuric and hydrochloric. It will be understood that the 2,4-dichlorophenoxyacetic acid is not completely insoluble in water, but, compared with the greater water-solubility of the isomeric 2,6-dichlorophenoxyacetic acid, it is insoluble for all practical purposes. This difference in water solubility between these two isomeric phenoxyacetic acids, as a result, affords an excellent method for effecting a separation between an undesirable and a desirable material.

My invention may best be illustrated by reference to the following specific example of its application to actual practice, although it is understood that it is given merely as an illustration and is not to be construed as limiting the scope of the invention. In the example that follows, all parts are given by weight.

*Example*

Into a suitable reaction vessel fitted with a gas disperser, reflux condenser, hydrogen chloride-absorber, flow-meter, thermometer, and with anhydrous conditions, are placed 141.0 parts of molten phenol (39–40° Bé.). With the internal temperature being held between 50–55° C., chlorine gas is passed into the molten phenol as rapidly as possible until a gain in weight of 105.0 parts occurs and the specific gravity stands at 1.39. Air is now blown through the molten phenolic mass until hydrogen chloride is no longer evolved.

With agitation throughout the reaction period, 50.0 parts of the chlorinated phenolic mass are added to a sodium hydroxide solution composed of 26.6 parts sodium hydroxide (76% flake) in 150.0 parts of water and stirred to solution. Then 29.0 parts of technical monochloroacetic acid (96–97% purity) are dissolved in the solution and the mass heated to an internal temperature of 95–100° C. for 45 minutes. An additional quantity of sodium hydroxide is now added in the amount of 4.3 parts in 25.0 parts of water and the reaction mass stirred until the phenol odor disappears. Then a solution of 7.3 parts of the monochloroacetic acid in 25.0 parts of water is added. The reaction temperature is now brought to 95–100° C. again, and held at this heat for a 3 hours total time from the start of the reaction. The contents are removed into 1,000.0 parts of cold water (20° C.) and, with stirring at room temperature (20° C.), 67.3 parts of 28% hydrochloric acid are added. After 15 minutes agitation, the liberated chlorinated phenoxyacetic acid is filtered. This filter cake is reslurried in 500.0 parts of cold water (20° C.) and refiltered. The cake is dried at 50–60° C. and the resulting dry cake now ground to a powder. The yield of the resulting 2,4-dichlorophenoxyacetic acid amounts to 84.1% of theory; M. P., 132–137° C. Mixed melting points of this material and substantially pure 2,4-dichlorophenoxyacetic acid prepared from substantially pure 2,4-dichlorophenol showed no depression; likewise, its activity as a plant growth regulatory factor and as a herbicide checked that of 2,4-dichlorophenoxyacetic acid prepared from 2,4-dichlorophenol.

The extent and amount of the water-washing governs to a degree the purity and yield of the 2,4-dichlorophenoxyacetic acid. In general, increased washing gives a purer and higher melting material, but at the expense of yield. By variations of the above washing procedure, i. e., by decantation washing until a pH of 2.9 was reached, material has been secured with a melting point of 135–7.5° C.

In the foregoing example a novel and unique process for manufacturing 2,4-dichlorophenoxyacetic acid has been disclosed. In this process, when the features of simplicity of operation, the low capital outlay involved, the quality and efficacy of the obtained material and the increased production volume are considered, it is seen that it possesses high merit and is of great value.

It will readily be seen that the present process is very advantageous as compared to prior processes involving chlorination of phenol and separation of the desired chlorophenols by fractionation.

The present invention avoids the necessity for a fractional distillation. It is no longer necessary to go through such complicated steps as fractional distillation followed by recombining of various fractions, cooling, centrifuging, perhaps redistilling and/or recombining with narrow cuts. Moreover, as previously pointed out, the products herein obtained are characterized by the fact that they consist almost entirely of ingredients which are active plant regulants and herbicides, and even the so-called "impure" compositions produced in accordance with the invention are suitable for many purposes.

Having thus described the invention, what I claim as new and desire to secure by Letters Patent of the United States is:

1. The method of preparing 2,4-dichlorophenoxyacetic acid which comprises essentially passing chlorine gas into molten phenol at a temperature above the melting point of the phenol until the phenol is principally dichlorinated, condensing the resultant mixture with mono-chloroacetic acid under alkaline conditions and acidifying the resultant reaction mixture, the quantity of chlorine and of mono-chloroacetic acid being effective to produce a condensation reaction product in said reaction mixture comprising essentially at least 84% by weight of 2,4-dichlorophenoxyacetic acid and a minor proportion of 2,6-dichlorophenoxyacetic acid, 2-chlorophenoxyacetic acid, 4-chlorophenoxyacetic acid and 2,4,6-trichlorophenoxyacetic acid, treating said reaction mixture with water during said acidification, isolating the insoluble part of said reaction mixture from the soluble part thereof, further treating the isolated part with water, the quantity of water added to the reaction mixture during said acidification and afterward to said isolated part being sufficient to dissolve substantially all of the 2,6-dichloro-, the 2-chloro-, and the 2,4,6-trichlorophenoxyacetic acids, and separating the resultant aqueous solution of chlorophenoxyacetic acids from the residual isolated undissolved part of the reaction mixture.

2. The method of preparing 2,4-dichlorophenoxyacetic acid which comprises essentially passing chlorine gas into molten phenol at a temperature of 50 degrees C. to 55 degrees C. until the phenol is principally dichlorinated, condensing the resultant mixture with mono-chloroacetic acid under alkaline conditions and acidifying the resultant reaction mixture, the quantity of chlorine and of mono-chloroacetic acid being effective to produce a condensation reaction product in said reaction mixture comprising essentially at least 84% by weight of 2,4-dichlorophenoxyacetic acid and a minor proportion of 2,6-dichlorophenoxyacetic acid, 2-chlorophenoxyacetic acid, 4-chlorophenoxyacetic acid and 2,4,6-trichlorophenoxyacetic acid, treating said reaction mixture with water during said acidification, isolating the insoluble part of said reaction mixture from the soluble part thereof, further treating the isolated part with water, the quantity of water added to the reaction mixture during said acidification and afterward to said isolated part being sufficient to dissolve substantially all of the 2,6-dichloro-, the 2-chloro-, and the 2,4,6-trichlorophenoxyacetic acids, and separating the resultant aqueous solution of chlorophenoxyacetic acids from the residual isolated undissolved part of the reaction mixture.

GRADY M. O'NEAL.

REFERENCES CITED

The following references are of record in the file of this patent:

UNITED STATES PATENTS

| Number | Name | Date |
|---|---|---|
| 554,938 | Lederer | Feb. 18, 1896 |
| 2,322,761 | Lontz | June 29, 1943 |
| 2,396,513 | Jones | Mar. 12, 1946 |

FOREIGN PATENTS

| Number | Country | Date |
|---|---|---|
| 76,597 | Germany | July 28, 1894 |
| 155,631 | Germany | Oct. 26, 1904 |

OTHER REFERENCES

Bischoff, Berichte (Deutsch. Chem. Gesell.), vol. 33, (1900), pp. 1603–1610.

Faust et al., Fischer, etc., Beistein (Handbuch der Org. Chem.), vol. 6 (4th ed.), pp. 183, 186, 189, (1923).

Pokorny, Jour. American Chem. Society, vol. 63, p. 1768 (1941).